(12) United States Patent
Soeda et al.

(10) Patent No.: US 9,154,021 B2
(45) Date of Patent: Oct. 6, 2015

(54) POWER TRANSMISSION DEVICE FOR ELECTRICALLY DRIVEN VEHICLE AND MANUFACTURING METHOD THEREFORE

(75) Inventors: Kazuhiko Soeda, Yokohama (JP); Seiji Hoshika, Kanagawa (JP); Kiyoshi Morikura, Tokai (JP); Takeshi Kariya, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 381 days.

(21) Appl. No.: 13/988,186

(22) PCT Filed: Sep. 30, 2011

(86) PCT No.: PCT/JP2011/072603
§ 371 (c)(1),
(2), (4) Date: May 30, 2013

(87) PCT Pub. No.: WO2012/066857
PCT Pub. Date: May 24, 2012

(65) Prior Publication Data
US 2013/0241342 A1     Sep. 19, 2013

(30) Foreign Application Priority Data
Nov. 18, 2010   (JP) ................................ 2010-257838

(51) Int. Cl.
*H02K 5/14* (2006.01)
*H02K 13/00* (2006.01)
*H02K 11/00* (2006.01)
(Continued)

(52) U.S. Cl.
CPC .............. *H02K 11/0089* (2013.01); *B60L 7/14* (2013.01); *B60L 11/1803* (2013.01); *H02K 15/00* (2013.01); *B60L 2220/14* (2013.01); *B60L 2240/12* (2013.01); *B60L 2270/147* (2013.01); *H02K 7/116* (2013.01);
(Continued)

(58) Field of Classification Search
CPC ....... B60L 7/14; B60L 11/1803; H02K 15/00; H02K 13/00; H02K 13/003; H02K 5/141; H02K 5/148; H02K 2205/06
USPC .......................................... 310/239, 242, 245
See application file for complete search history.

(56) References Cited

U.S. PATENT DOCUMENTS 3,242,362 A * 3/1966 Ciliax ........................... 310/239
(Continued)

FOREIGN PATENT DOCUMENTS

| JP | 63-036156 A | 2/1988 |
| JP | 2006-320129 A | 11/2006 |
| JP | 2007-288840 A | 11/2007 |
| JP | 2008-099524 A | 4/2008 |

*Primary Examiner* — Terrance Kenerly
(74) *Attorney, Agent, or Firm* — Global IP Counselors, LLP

(57) ABSTRACT

A power transmission device for an electrically driven vehicle basically includes a power transmission mechanism, a sliding contact brush, a brush case cover, and a brush protective jig. The power transmission mechanism includes a case element, an axle element and a power transmission element. The sliding contact brush is mounted on an axle end of the axle element. The brush case cover is selectively mounted to the case element to enclose the axle end of the axle element in the case element. The brush protective jig is mounted to cover the brush contact when mounting the sliding contact brush to the axle end. The brush protective jig is dimensioned to contact the brush case cover and to prevent the brush case cover from being mounted to the case element while the brush protective jig is in an attached state that covers the brush contact.

7 Claims, 11 Drawing Sheets

(51) Int. Cl.
   *H02K 15/00* (2006.01)
   *B60L 7/14* (2006.01)
   *B60L 11/18* (2006.01)
   *H02K 7/116* (2006.01)

(52) U.S. Cl.
   CPC .......... *H02K 2205/06* (2013.01); *Y02T 10/641* (2013.01); *Y02T 10/7005* (2013.01); *Y02T 90/16* (2013.01); *Y10T 29/49009* (2015.01)

(56) References Cited

U.S. PATENT DOCUMENTS

| | | | | |
|---|---|---|---|---|
| 3,267,312 | A * | 8/1966 | Redick et al. | 310/239 |
| 5,495,134 | A * | 2/1996 | Rosenblum | 310/239 |
| 6,967,426 | B2 * | 11/2005 | Tsuge et al. | 310/239 |
| 2003/0160534 | A1 * | 8/2003 | Tsuge et al. | 310/239 |
| 2010/0289360 | A1 * | 11/2010 | Grabner et al. | 310/85 |

* cited by examiner

POWER TRANSMISSION DEVICE FOR ELECTRICALLY DRIVEN VEHICLE AND MANUFACTURING METHOD THEREFORE

CROSS-REFERENCE TO RELATED APPLICATIONS

This application is a U.S. National stage of International Application No. PCT/JP2011/072603, filed Sep. 30, 2011. This application claims priority to Japanese Patent Application No. 2010-257838, filed with Japan Patent Office on Nov. 18, 2010.

BACKGROUND

1. Field of the Invention

The present invention relates to a power transmission device for an electrically driven vehicle, such as electric vehicle, and a manufacturing method therefore, in which a countermeasure is taken to suppress high-frequency noise from an inverter.

2. Background Information

In an electrically driven vehicle having an electric motor that provided at least as driving source for travel, it is known that a high-frequency noise (also referred to as "radio noise") from an inverter as a source of generation, which controls the motor is emitted to the outside with the motor drive system used as antenna, thereby adversely affecting the radio receiver.

As countermeasure, such a conventional device is known where a slide brush which is electrically connected to a vehicle body is mounted to a motor shaft driven by an inverter at a location opposite to a power transmission mechanism with respect to a rotor (for example, see Japanese Laid-Open Patent Application Publication No. 2006-320129).

SUMMARY

However, in the conventional device, when installing the sliding contact brush, the resistance of the sliding contact brush will change when touched by grease or foreign matter on the hand. The sliding contact for grounding brushes is of low resistance and must be avoided that the resistance value would change. Therefore, it is contemplated to assemble or mount with a brush protective jig or fixture attached for protecting brush contacts. However, when mounting the case cover, the fixture for protecting the brush contacts may be forgotten to be removed. However, when a case cover is attached while forgetting to remove the brush protective jig, brush contacts remain protected without being grounded. Moreover, there is a problem that, when had been covered after the cover is that no longer can be left as it is without being aware that it is not connected to ground, to reduce radio noise.

The present invention has been made focusing on the above problems, and has the object to provide a power transmission device for an electrically driven vehicle and manufacturing method therefore, to prevent forgetting removal of the brush protective jig for protecting brush contacts when assembling a sliding contact brush contact, while improving workability at the time of slide brush installation and ensuring the radio noise reduction performance.

In order to achieve the object identified above, the power transmission device for an electrically driven vehicle according to the present invention is provided with a power transmission mechanism, a sliding contact brush, a brush case cover, and a brush protective jig. The power transmission mechanism is interposed between a motor shaft of a motor which is driven by an inverter and drive wheels, and is comprised of a case element, an axle element, and a power transmission element. The sliding contact brush is disposed on the axle end of the axle element, with one end thereof being maintained in contact with the axle end while the other end being grounded to a vehicle body. The brush case cover is mounted on a cover mount portion that encloses the axle end of the case element describe above and opens to form thereby a brush chamber accommodating the sliding contact brush. The brush protective jig is attached to cover the brush contact during assembly of the sliding contact brush to the axle end, and the brush protective jig or fixture is configured to have such a length by which, when mounting the brush case cover to the cover mount portion, the brush case cover would interfere with the brush case cover when the brush protective jig remains in an attached state. To achieve the object described above, in the manufacturing method of a power transmission device for an electrically driven vehicle according to the present invention, a power transmission mechanism is provided which is interposed between a motor shaft of a motor driven by an inverter and drive wheels and having a case element, an axle element, and a power transmission element, wherein a process to assemble a sliding contact brush, a process to remove a brush protective jig, and a process to mount a brush case cover. In the process to install or assembly the sliding contact brush, the sliding contact brush is installed or assembled at the axle end position of the axle element with one end maintained contact with the axle end while the other end electrically grounded with respect to vehicle body. In the process to remove the brush protective jig, a brush protective jig is removed which is attached to cover the brush contact when installing the sliding contact brush to the axle end, and is configured to provide such a length by which, without being removed, the brush protective jig would conflict with the brush case cover. In the process to mount the brush case cover, the brush case forming a brush chamber that accommodates the sliding contact brush is mounted to the cover mounting portion which encloses the axle end portion of the axle element in the case element and opens.

Thus, when assembling the sliding contact brush to the axle end of the axle element, the brush protective jig is attached over the brush contact of the sliding contact brush. Further, when mounting the brush case cover to the cover mounting portion, if the brush protective jig remains in an attached state, then the brush protective jig conflicts with the brush case cover. Therefore, unless the brush protective jig is removed, the brush case cover cannot be mounted to the cover mount portion so that the brush protective jig will be prevented from being forgotten to be removed or detached. Further, the brush protective jig is configured to have such an axial length to conflict with the brush case cover when the brush case cover is being mounted to the cover mount portion. Stated another way, the axial length of the brush protective jig is set greater than the axial length of the sliding contact brush. Therefore, during attaching process to the sliding contact brush, the brush protective jig may be easily grasped and easy attachment or removal thereof to improve workability.

As a result, during the time of installation or assembly of the sliding contact brush, while improving the workability, removal of the brush protective jig for protecting the brush contact will be avoided to be forgotten, and performance regarding radio noise reduction will be secured.

In the following, description is made of the best mode realizing the power transmission device according to the present invention with reference to the first embodiment shown in the figures.

FIRST EMBODIMENT

Figure 1:
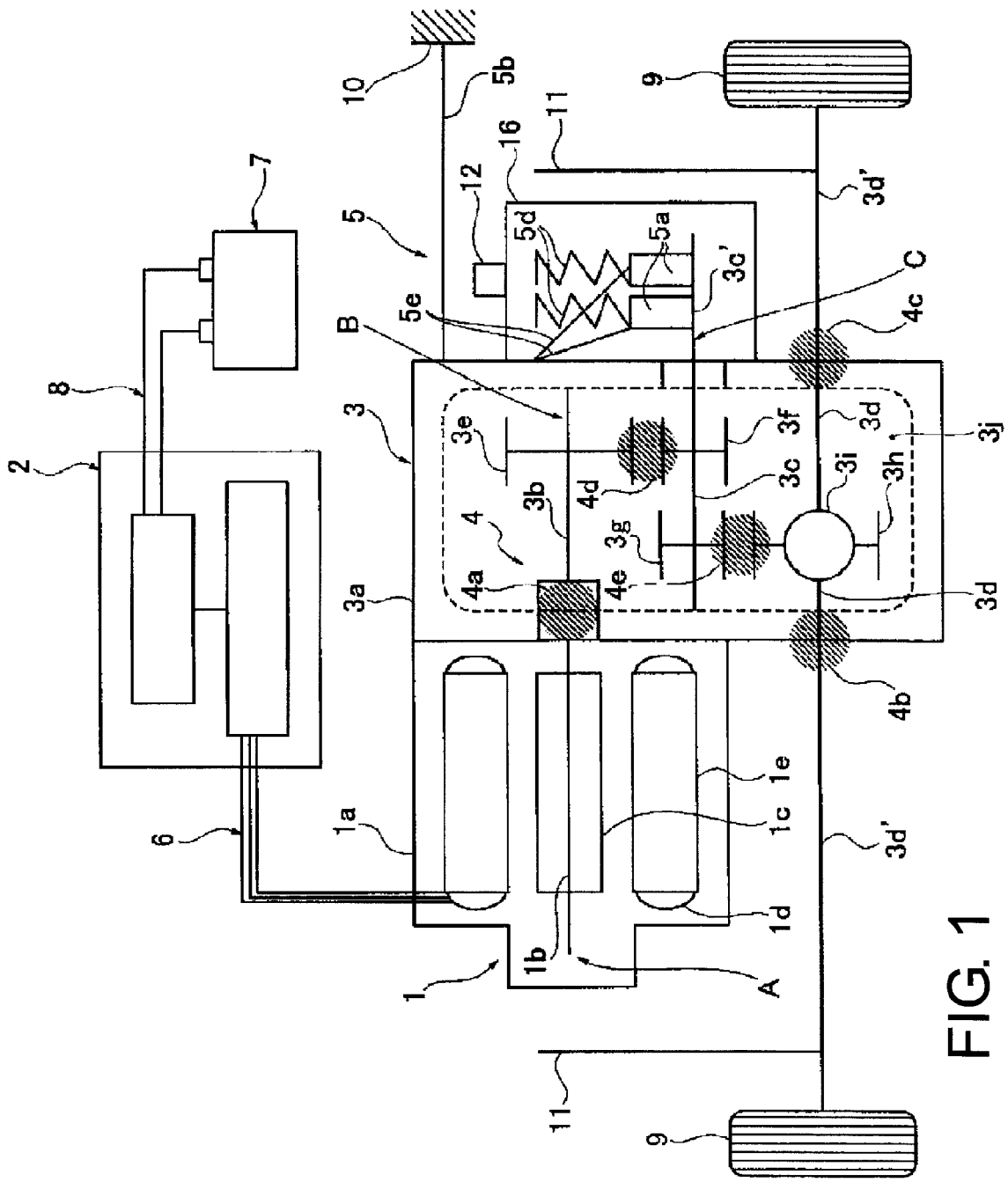
FIG. 1 is an overall schematic diagram showing a power transmission device for an electric vehicle (example of power transmission device for an electrically driven vehicle).

First, the configuration will be described. FIG. 1 is a schematic diagram showing an overall structure of a power transmission device for an electric vehicle (an example of power transmission device for an electrically driven vehicle). Overall structure or configuration is now described based on FIG. 1.

As shown in FIG. 1, the power transmission device in the first embodiment for an electric vehicle is provided with a motor 1, an inverter 2, a gear reduction mechanism 3 (power transmission mechanism), a power transmission coupling unit 4 and a sliding contact brush ground structure 5.

The motor 1 is provided with a motor housing 1a, a motor shaft 1b rotatably mounted on the motor housing 1a, a rotor 1c fixed to the motor shaft 1b, a stator 1e with a plurality of motor coils 1d wounded thereon. As this motor 1, a synchronous motor of embedded magnets is used and the rotor 1c has permanent magnets embedded therein.

The inverter 2 is connected to a motor coil 1d of the motor 1 via a three phase alternating current cable 6 while connected to a second battery 7 via a DC power cable 8. This inverter 2 has a function as a high-frequency controller for changing the direction of the current by the switching element. In a drive mode, DC current from the secondary battery 7 is converted to three-phase alternating current to the motor 1 while, at regeneration, the three-phase AC from the motor 1 will be converted to DC to the secondary battery 7.

The gear reduction mechanism 3 is interposed between the motor shaft 1b and a pair of drive wheels 9, 9, and is a power transmission mechanism having a case element, shaft element and power transmission element. A gear case 3a accommodating the shaft element and power transmission element serves as the case element. As the shaft element, an input shaft 3b, a countershaft 3c, and a pair of output shafts 3d, 3d are included. The power transmission mechanism including a gear train is provided with an input gear 3e, a first counter gear 3f, a second counter gear 3g, a drive gear 3h, and a differential gear 3l.

The power transmission coupling portion 4 is provided in a power transmission pathway from the motor shaft 1b to the drive wheels 9, 9, and represents a resistance body imparting an electric resistance downstream of the motor shaft 1b. As this power transmission coupling 4, a spline fitting portion 4a, a pair of coupling portions 4b, 4c, a pair of gear meshing portion 4d, 4e, and the like may be used as being previously provided in the power transmission pathway of the gear reduction mechanism 3 for imparting electric resistance. The spline fitting portion 4a is a portion at which the motor shaft 1b and the input shaft 3b are connected via a spline. The coupling portion 4b, 4b presents a coupling portion between the output shafts 3d, 3d of the gear reduction mechanism 3 and the drive shaft 3d', 3d' to the drive wheels 9, 9. The gear meshing portion 4d represents a meshing portion between the input gear 3e and the first counter gear 3f, and the gear meshing portion 4e is a meshing portion between the second counter gear 3g and the drive gear 3h.

The sliding contact brush ground structure 5 is a structure which connects electrically the position in the power transmission pathway at downstream of the power transmission coupling portion 4 (the spline fitting portion 4a, the gear meshing portion 4d) as a resistance body with a vehicle body 10. This sliding contact brush ground structure 5 is provided with a pair of brush contacts 5a, 5a, a pair of springs 5d, 5d, leads 5e, 5e, a gear case 3a, and a connecting line 5b. The brush contacts 5a, 5a slides with the shaft end 3c' of the countershaft 3c of gear reduction mechanism at the urging force of the spring 5d, 5d. The lead 5e, 5e connects electrically brush contacts 5a, 5a and gear case 3a. The connecting line 5b connects electrically gear case 3a and vehicle body 10. In FIG. 1, reference numerals 11, 11 denote left and right suspensions, reference numeral 12 denotes a breather hole.

Figure 2:
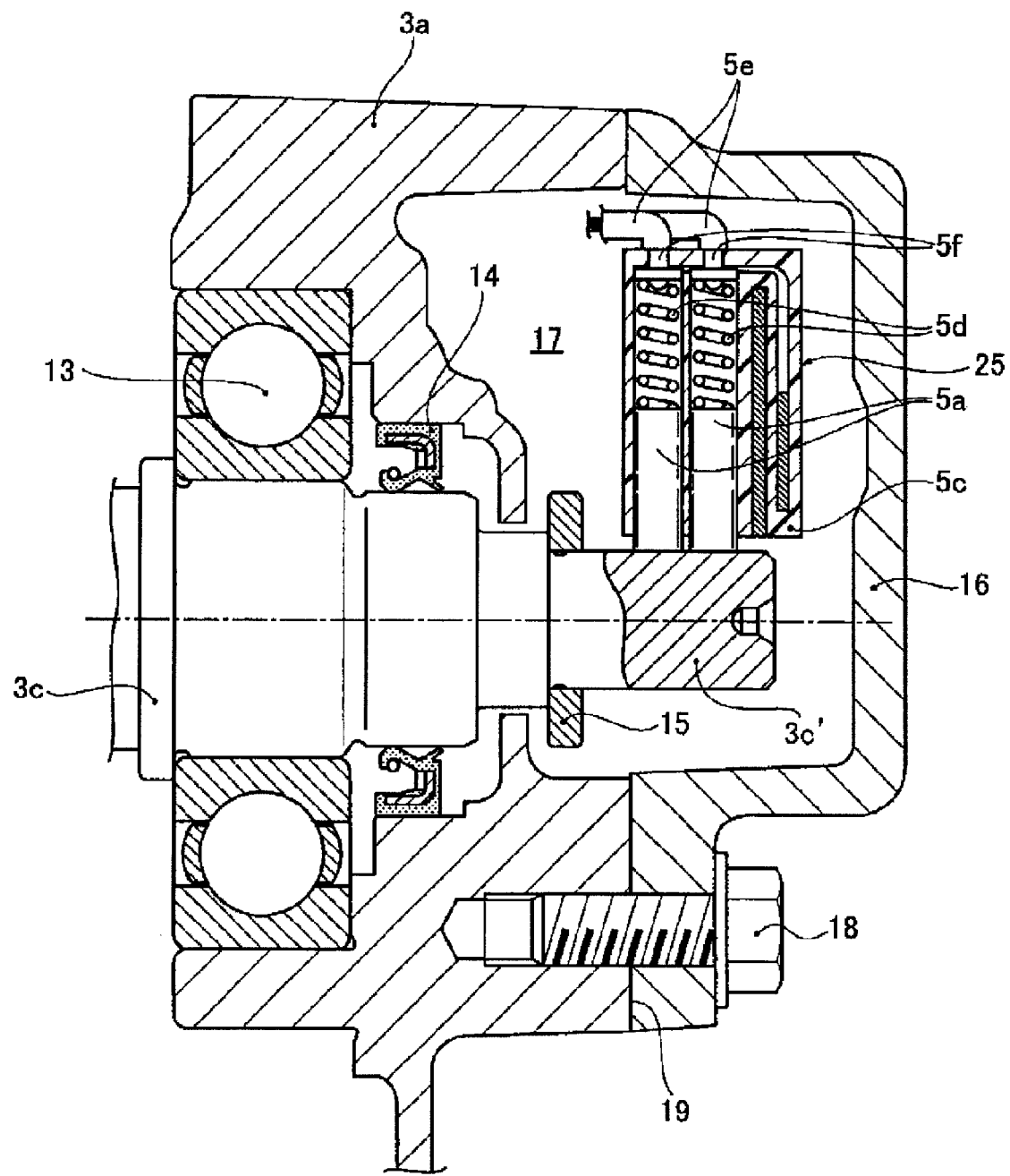
FIG. 2 is a cross-sectional view of essential parts showing the area in which the sliding contact brush assembly is located in the power transmission device of an electric vehicle in the first embodiment.
Figure 3:
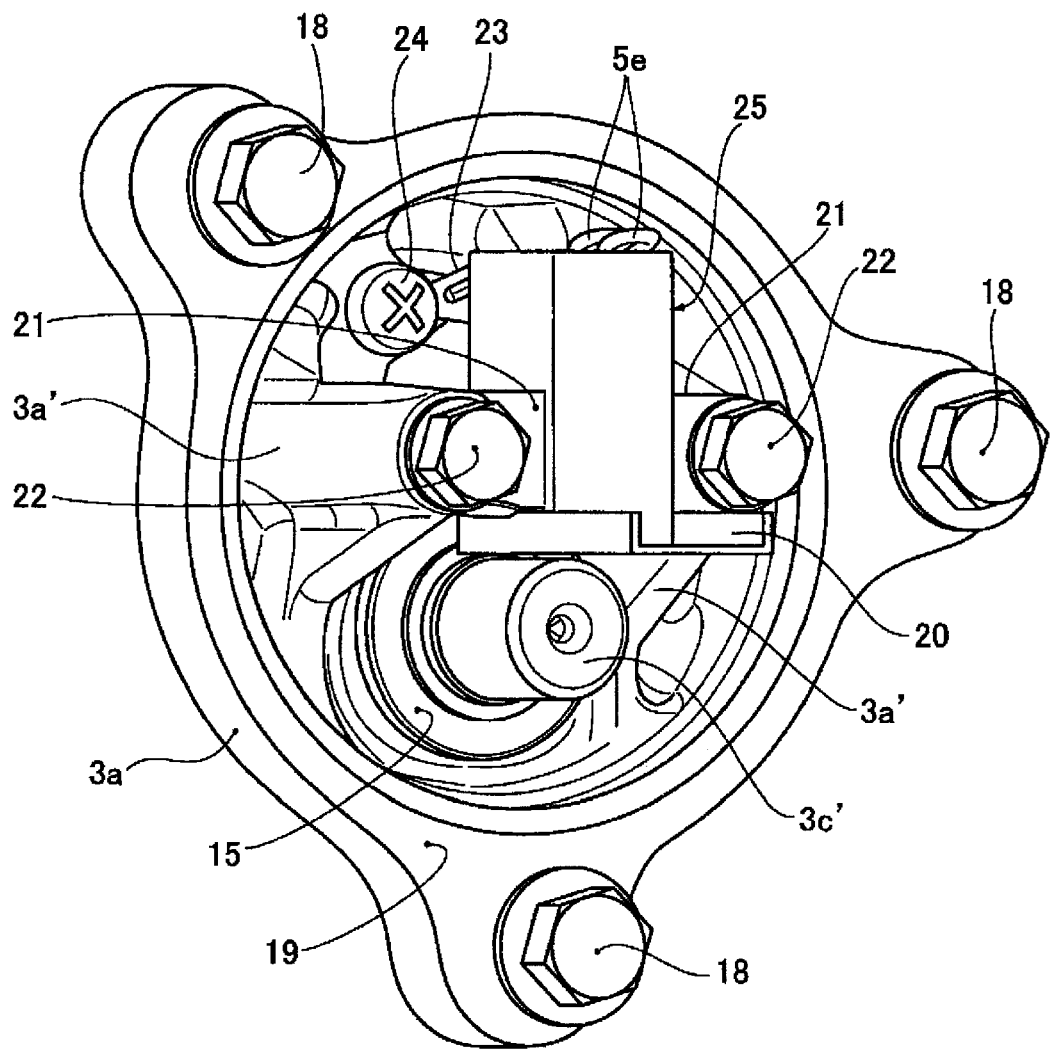
FIG. 3 is a perspective view of essential parts showing an assembled state of the sliding contact brush assembly with the protective jig being attached in the power transmission device for an electric vehicle in the first embodiment.
Figure 4:
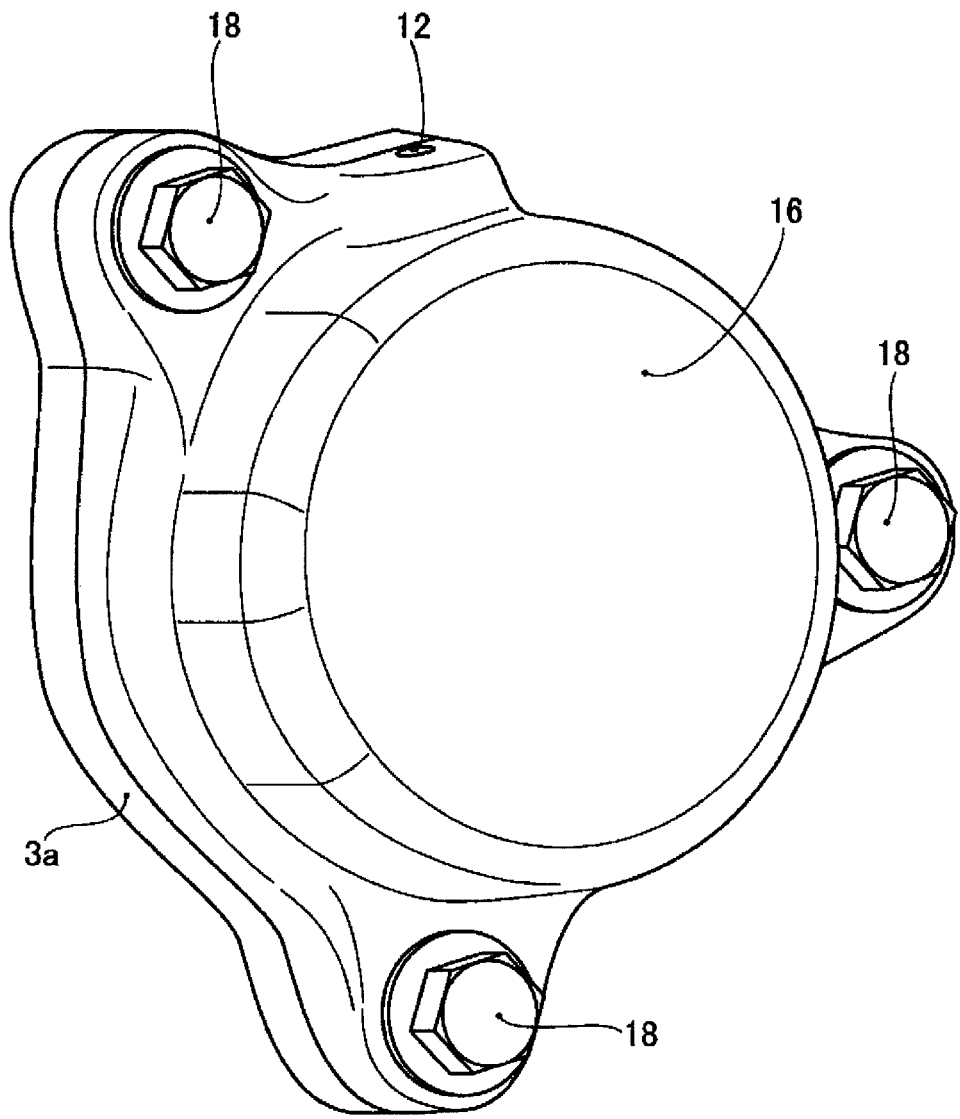
FIG. 4 is a perspective view of essential parts showing a final assembly state in which the location of the sliding contact brush assembly is covered in a power transmission device for an electric vehicle in the first embodiment.

FIGS. 2-4 show the setup portion of the sliding contact brush assembly 25 in a power transmission device for an electric vehicle in the first embodiment. Hereinafter, on the basis of FIGS. 2-4, the configuration of a setup portion of sliding contact brush assembly 25 is described.

As shown in FIG. 2, the countershaft 3c is rotatably supported on the gear case 3a via a ball bearing 13, and the first counter gear 3f (see FIG. 1) is fitted by spline on the inner position of the ball bearing 13. At the outside position of the ball bearing 13 is provided an oil seal 14 on the gear case 3a. Moreover, at the position of the shaft end 3c' (axle end) of the countershaft 3c (shaft portion), which projects from the gear case 3a, a stopper 15 and a pair of brush contacts 5a, 5a are provided which represent an electrical connection position CP of the sliding contact brush assembly 25 in the electric power transmission pathway.

The stopper 15 is provided, as shown in FIGS. 2 and 3, on the shaft end 3c' at the step position located on the rear side of the pair of contact positions of the brush contacts 5a, 5a. This stopper 15 is of collar member intended, when mounting the brush case cover 16 to cover a mounting portion 19, and to prevent the protective cover 20 (brush protective jig) from being pushed in an attached state as shown in FIG. 3.

As shown in FIG. 4, shaft end 3c' of the countershaft 3c is covered by the brush case cover 16. As shown in FIG. 3, the brush case cover 16 is mounted to cover mounting portion 19 enclosing the shaft end 3c' of the gear case 3a to open via bolt 18. By mounting and fixing the brush case cover 16, as shown in FIG. 2, a brush chamber 17 is formed in communication with an interior chamber 3j of the gear case 3a. Further, the brush case cover 16 is formed with the breather hole 12 disposed on the brush chamber 17, as shown in FIG. 4.

Each of the brush contacts 5a, 5a has a slip ring surface formed by a cylindrical surface of the shaft end 3c' of the countershaft 3c. The brush contacts 5a, 5a and the springs 5d, 5d are provided within two receiving holes of the brush holder 5c which is an insulating material, and thus contact pressure may be held by the springs 5d, 5d to maintain contact with the shaft end 3c' of the countershaft 3c.

As shown in FIG. 3, the brush holder 5c has a case fixing plate 21 which is fixed to the case extension 3a' extending from the gear case 3a via a pair of bolts 22. By fixation of the brush holder 5c by the bolts 22 to the case, the brush contacts 5a, 5a are disposed while maintaining contact with the shaft end 3c' of the countershaft 3c.

Description of the configuration of the electrical connection of the brush contacts 5a, 5a to the gear case 3a is now described. The brush contacts 5a, 5a rest on a pair of spring seats 5f, 5f via the springs 5d, 5d, and a pair of leads 5e, 5e is connected to these spring seats 5f, 5f. In addition, the ends of leads 5e, 5e are connected, as shown in FIG. 3, to a ground plate 23 provided with the brush holder 5c by soldering. Moreover, the ground plate 23 is fixed to the gear case 3a via a screw 24. Through this configuration, two contacts are connected electrically to the gear case 3a.

Figure 5:
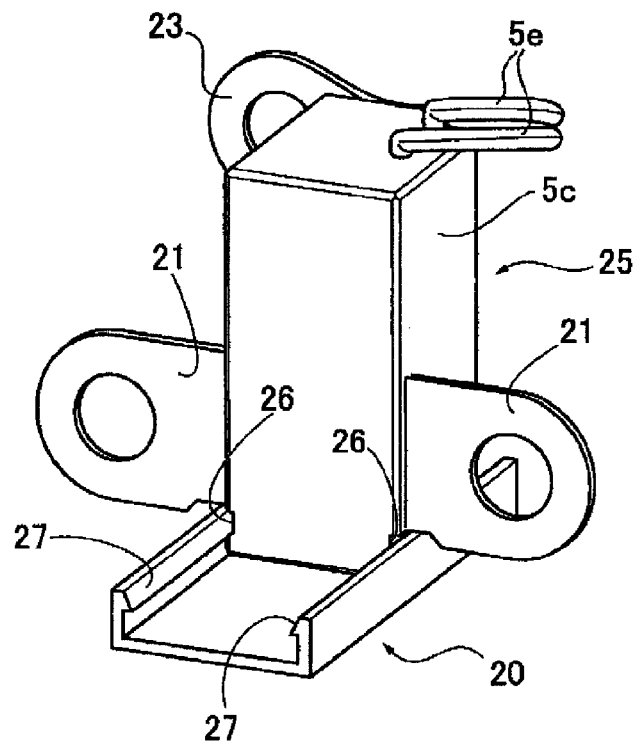
FIG. 5 is a perspective view showing a state in which protective cover is attached on the sliding contact brush assembly in the power transmission device for an electric vehicle in the first embodiment.
Figure 6:
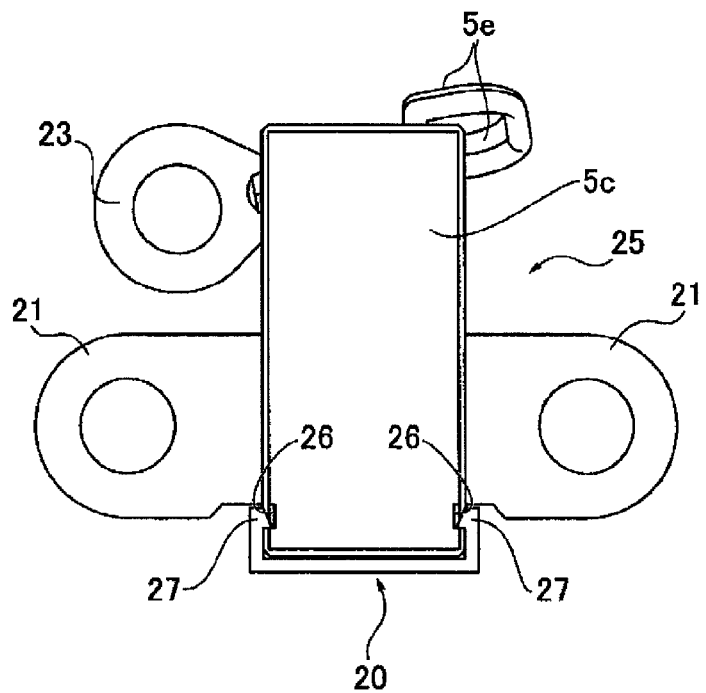
FIG. 6 is a front view of a state in which sliding contact brush assembly is attached with a protective cover in the power transmission device for an electric vehicle in the first embodiment.

FIGS. 5 and 6 respectively show a state in which the protective cover 20 is attached to the sliding contact brush assembly 25 in a power transmission device for an electric vehicle in the first embodiment. The following describes the slide structure of the protective cover 20 and the sliding contact brush assembly 25.

As shown in FIGS. 5 and 6, the sliding contact brush assembly 25 is provided with the brush holder 5c, the leads 5e, 5e, the case fixing plate 21, and the ground plate 23, and is structured as a pre-assembled unit. Inside the brush holder 5c, as described above, the brush contacts 5a, 5a, the springs 5d, 5d, and the spring seats 5f, 5f are housed.

As shown in FIGS. 5 and 6, the brush holder 5c comprises a pair of grooves 26, 26 extending axially at lower position of the surfaces of both sides sandwiching the end surfaces from which the brush contacts 5a, 5a project.

The protective cover 20 has a pair of slide pawls 27, 27 extending parallel to each other to engage with the pair of parallel slide grooves of brush holder 5c when mounting to brush holder 5c.

Figure 7:
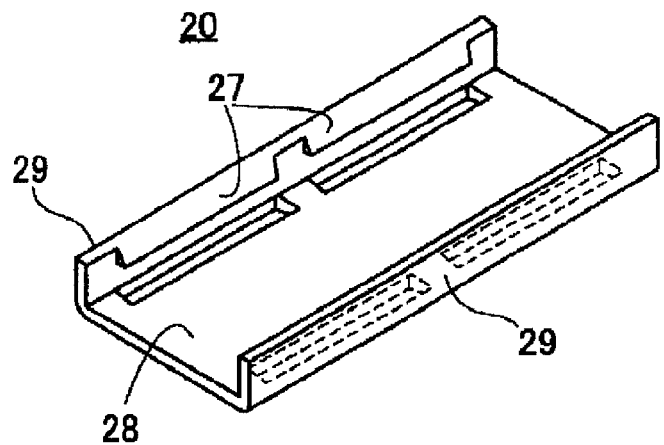
FIG. 7 is a perspective view of the protective cover in the power transmission device for an electric vehicle in the first embodiment.
Figure 8:
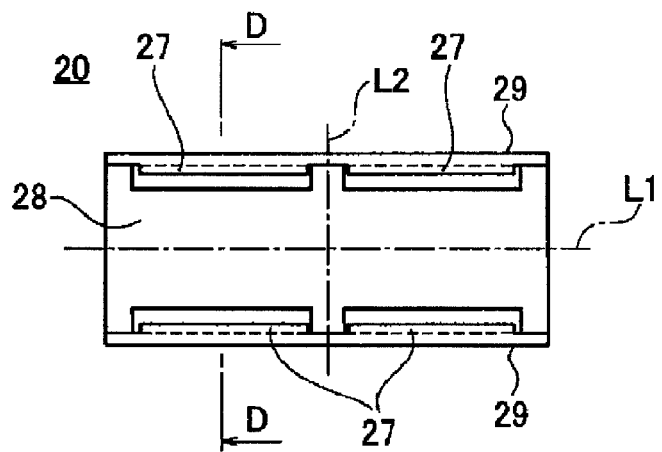
FIG. 8 is a plan view showing a protective cover in the power transmission device for an electric vehicle in the first embodiment.
Figure 9:
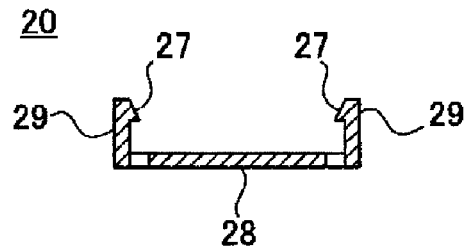
FIG. 9 is a cross-sectional view of protective cover along D-D in FIG. 8 in a power transmission device for an electric vehicle.

FIGS. 7-9 show a configuration of a protective cover 20 of the power transmission device for an electric vehicle in the first embodiment. The following describes the configuration of the protective cover 20.

The protective cover 20 is provided with a main cover portion 28 covering the brush contacts 5a, 5a, a pair of sub-cover portions 29 and 29 rising from both sides of the main cover portion, a pair of slide claws formed on the end portions of the sub-cover portions 29, 29. The feature of the protective cover resides in that, as shown in FIG. 8, it is symmetrical with respect to an axial symmetry axis L1 as well as with respect to a symmetry axis L2, an orthogonal direction relative to the axis.

Figure 10:
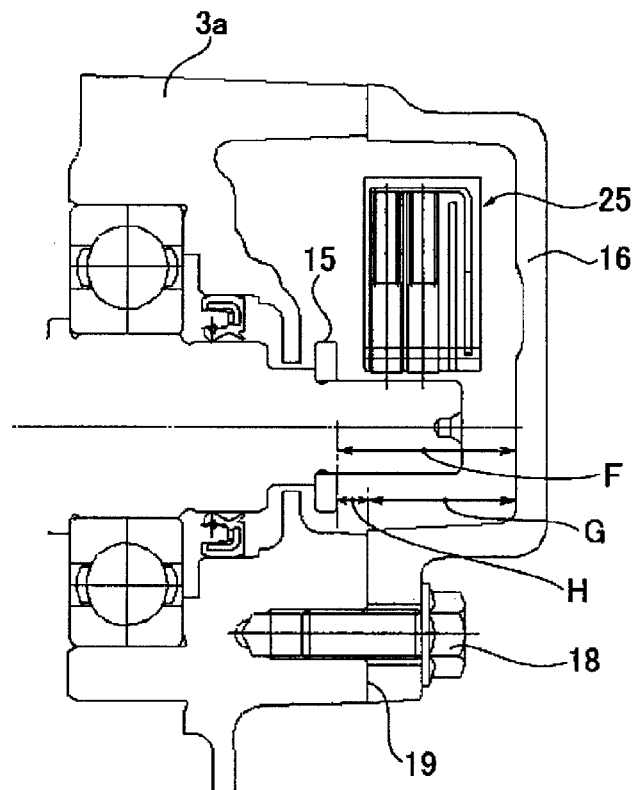
FIG. 10 is a diagram explaining an axial length in a final assembly state in which the location of the sliding contact brush assembly is covered by a brush case cover in the power transmission device for an electric vehicle in the first embodiment.
Figure 11:
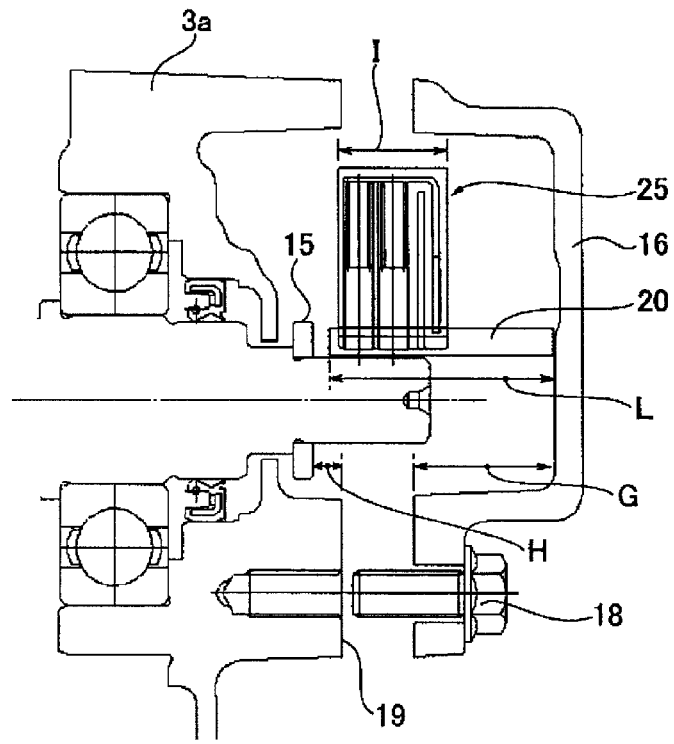
FIG. 11 is a diagram showing a relationship with respect to the axial length by which, through interposition of protective cover, the location of sliding contact brush assembly may not be covered by brush case cover in a power transmission device for an electric vehicle.

FIGS. 10 and 11 show the axial dimensions of the setup portion of sliding contact brush in the power transmission device for an electric vehicle. Hereinafter, the setting of axial dimension of the protective cover 2 is described.

The protective cover 20 is a protective jig that is mounted or attached over the brush contacts 5a, 5a when assembling the brush assembly 25 to the shaft end 3c'. The axial length L of the protective cover 20 is set to the length in such a way that, when mounting the brush case cover 1 to cover the mounting portion 19, the protective cover would interfere with the brush case cover 16 when mounted to the mounting portion 19 if remained in the mounted state.

That is, as shown in FIG. 10, the internal clearance F is represented by the formula:

Internal clearance $F$=cover depth $G$+stopper depth $H$

Therefore, as shown in FIG. 11, if, between the axial length L (=length of protective cover) of the protective cover 20 and the internal clearance F, the following relationship is established:

Length of protective cover $L$>Internal clearance $F$ then, the length of protective cover represents a length by which interference with brush case cover 16 takes place when the protective cover remains attached during installation. Further, since the slide brush assembly 25 is accommodated in the brush chamber 17 without interference with the sliding contact brush assembly 25, when considering to include an axial length l (=length of brush) of the sliding contact brush assembly 25, the following relationship is established:

Length of protective cover $L$>Internal clearance $F$>Brush length $l$

The operation is now described. First, a description of the "principle of generation of high-frequency noise and problems of comparative example". Subsequently, the operation in the power transmission for an electrically driven vehicle of the first embodiment is described separately in the order of "operation of high-frequency noise reduction", "operation of the sliding contact brush setup for the gear reduction mechanism", "comparison of noise reduction operation depending on the ground position", "preventive operation to forget removal of protective cover".

Principle of generation of high-frequency noise and problems of the comparative example will now be discussed. Like a hybrid vehicle or an electric vehicle, in an electrically driven vehicle in which an electric motor is provided as part of driving power for travel, it is known that the high-frequency noise emitted from an inverter for controlling the motor can adversely affect the radio receiver or the like due radiation to the outside as motor drive system as antenna.

Figure 12:
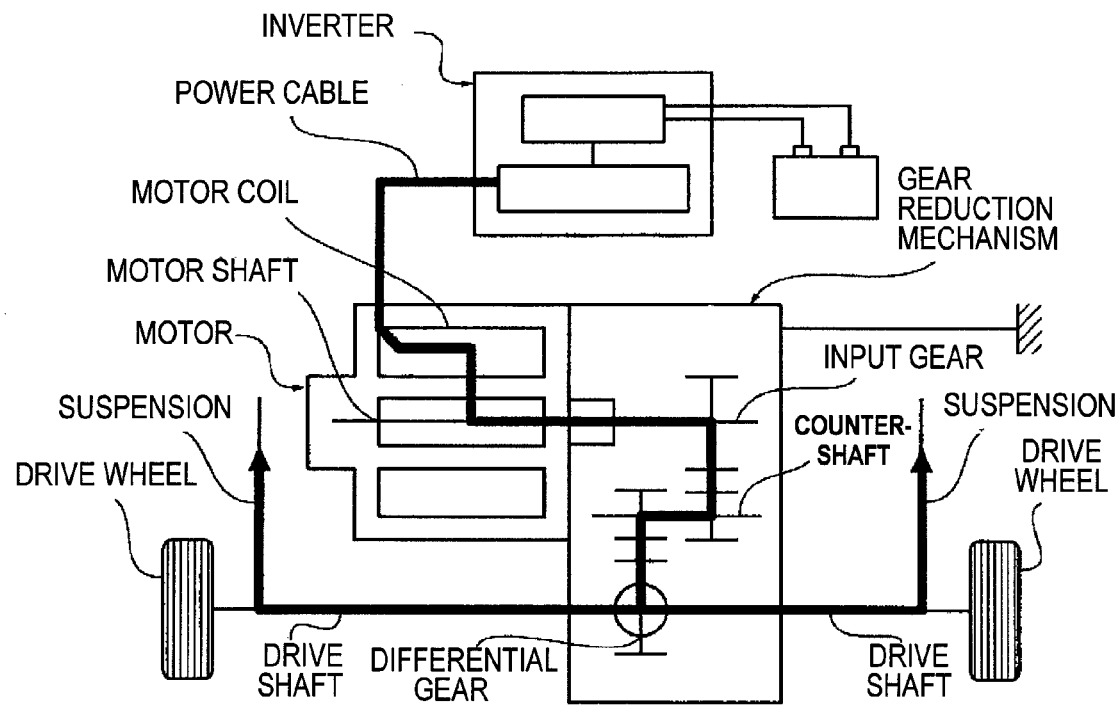
FIG. 12 is a schematic diagram showing a transmission path of high-frequency noise from a source of motor controlling inverter when no noise suppression is pursued in the power transmission device for an electric vehicle.

The principle of generation of high frequency noise will be described with reference to FIG. 12. In the phase control of an inverter to change the direction of the current through the switching element, since there is a steep rise in waveform of the current (voltage) when turned on, a high-frequency clicking noise (=high-frequency noise) occurs. As indicated by the bold arrows in FIG. 12, the high-frequency noise generated by the inverter is transmitted to the motor shaft via a power cable and a motor coil. It is further propagated from the motor shaft via an input gear of the reduction unit, the countershaft, the differential gear, and the drive shaft to the suspension, which is insulated by the drive wheels. The propagation or transmission path as indicated by bold arrows in FIG. 12 acts as an antenna to emit the high-frequency noise to the outside, thereby causing electromagnetic interference.

By comparison, as described in the prior art described above, a comparative example is set in which the electrical contact position of sliding contact brush is located at motor shaft and is grounded to the vehicle body at the position of the electrical connection of the motor shaft.

Figure 13:
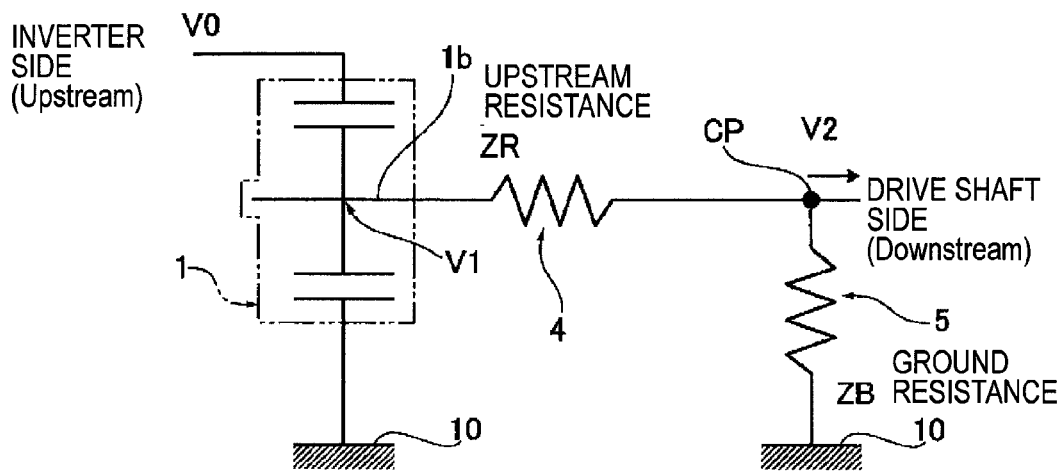
FIG. 13 is a noise transmission circuit diagram showing a transmission circuit of high-frequency noise in a power transmission device for an electric vehicle.

First, in order to reduce high-frequency noise from the inverter, it is necessary to reduce the output voltage V2 going out to the drive shaft from the motor (see FIG. 13). Here, output voltage V2 may be expressed by the equation;

$$V2=\{ZB/(ZB+ZR)\} \times V1 \qquad (1)$$

Here, V1: motor side voltage, ZB: ground resistance, ZR: upstream resistance, respectively.

As is apparent from equation (1) above, to reduce the output voltage V2, along with the reduction in the ground resistance ZB due to sliding contact brush and the like, at the upstream side of electrical contact position for grounding, i.e., the upstream resistance ZR on the noise generation side has to be increased.

In contrast, in the comparative example described above, although the motor shaft may be grounded to the vehicle body, the position of grounding is at the motor shaft. Thus, the inverter, i.e., source of noise generation, is close, the distance between the source of noise generation (inverter) and the position of electrical contact for grounding (motor shaft) is short, and the upstream resistance ZR will be smaller. Therefore, reduction of output voltage V2 is of small margin, noise propagation occurs downstream in the drive shaft direction.

Reduction effect of high frequency noise will now be discussed. As described above, in the power transmission device for an electric vehicle equipped with the inverter 2 as a source of noise, it is important to secure the large upstream resistance ZR to reduce high-frequency noise emitted to the outside. The following describes the reduction effect of high-frequency noise in a first embodiment reflecting this.

In a power transmission device for an electric vehicle in the first embodiment, a power transmission coupling portion 4 is provided in a power transmission path extending from the motor shaft 1b to the drive wheels 9, 9. In addition, the sliding contact brush ground structure 5 is electrically connected to the vehicle body 10. Further, the positional relationship between the power transmission coupling portion 4 and the sliding contact brush ground structure 5 is such that the power transmission coupling portion 4 (resistance body) is provided downstream of the motor shaft 1b, and the position further downstream of the power transmission coupling portion 4 is set as the electrical connection position CP of the sliding contact brush ground structure 5.

Therefore, since the electrical connection position CP of the sliding contact brush ground structure 5 is located downstream of the motor shaft 1b and the power transmission coupling portion 4, compared with the comparative example in which the motor shaft is selected as the electrical connection position, such a positional relationship is obtained remote from the inverter, i.e., source of noise generation. In addition, due to the power transmission connection portion 4, the electric resistance (upstream side resistance ZR) is provided at upstream position from the electrical connection position CP of the sliding contact brush ground structure 5.

Therefore, the upstream side resistance ZR representing the upstream resistance of the electrical connection position CP of the sliding contact brush ground structure 5 becomes larger, and as apparent from equation (1) described above, the output voltage V2 can be reduced. Therefore, the output voltage, V2 exiting downstream from the electrical connection position CP of the sliding contact brush ground structure 5 is attenuated, and the noise propagated from upstream to downstream in the power transmission path is reduced.

Thus, by reducing the noise propagation from the inverter 2 via the motor 1 towards the power transmission path, a noise emission function in which a high-frequency noise will be radiated to outside by an antenna formed by the output shafts 3d, 3d positioned in a power transmission path extending from the motor 1 to the drive wheel 9.

As described above, in the power transmission device of an electric vehicle in the first embodiment, at downstream position from the motor shaft 1b, a power transmission coupling portion 4 is provided, and at the position further downstream of the power transmission coupling portion, an electrical connection position CP of the sliding contact brush ground structure 5 is configured to be set. Consequently, it is possible, in an electric vehicle equipped with the inverter 2 as a source of noise, to reduce high-frequency noise emitted to the outside.

Setup Operation of the sliding contact brush for the gear reduction mechanism will now be discussed. In the first embodiment, the electrical coupling position P of the sliding contact brush structure 5 is set by the brush contacts 5a, 5a that slidably contacts the shaft end 3c' of countershaft 3. Therefore, it is necessary to ensure that brush contacts 5a, 5a will be operable stably as the electrical contact position CP of the sliding contact brush ground structure 5 as well. Now, the setup operation of the sliding contact brush to the gear reduction mechanism 3 reflecting this will be described.

In the sliding contact brush ground structure 5 in the first embodiment, the brush contacts 5a, 5a are set to slidably contact the shaft end 3c' of the countershaft 3c separated by the oil seal 14 from the first counter gear 3e. In other words, the setup positions of the brush contacts 5a, 5a are located from lubricating oil stirred in the gear chamber 3j of the gear reduction mechanism 3. Thus, by separating from lubricating oil of the gear reduction mechanism 3, a stable contact resistance due to the brush contacts 5a, 5a may be maintained. In addition, wear particles generated through contact of the brush contacts 5a, 5a may be prevented from intruding the gear chamber 3j of the gear reduction mechanism 3.

In the first embodiment, the positions of the brush contacts 5a, 5a are set at the shaft end 3c' projecting from the gear case 3a of the gear reduction mechanism 3. In addition, the shaft end 3c' is covered, the brush case cover 16 forming the brush chamber 17 in communication with the gear chamber 3j of the gear reduction mechanism 3 is fixed to the gear case 3a, and the breather hole 12 is provided in the brush case cover 16 to be disposed on the brush chamber 17. That is, both the gear chamber 3j of the gear reduction mechanism 3j and the brush chamber 17 setting up the brush contacts 5a, 5a are communicated with the outside through the breather hole 12, so that the difference between the gear chamber 3j and the brush chamber 17 is suppressed to generate. Therefore, when the internal pressure of the gear reduction mechanism 3j is increased, lubricating oil in the gear chamber 3j may be prevented from leaking to the brush chamber 17 through the oil seal 14.

The power transmission mechanism in the first embodiment is the gear reduction mechanism 3 having the input shaft 3b, the countershaft 3c, the output shafts 3d, 3d, the gear trains 3e, 3f, and the gear trains 3g, 3h where the electrical coupling position CP of sliding contact brush ground structure is set at the position of the shaft end 3c' of the countershaft 3c. That is, the spline fitting portion 4a and the gear meshing portion 4d are provided upstream of the electrical coupling position CP of the sliding contact brush ground structure 5, and the upstream side resistance ZR is secured by the power transmission coupling portion 4. Therefore, by ensuring large upstream side resistance ZR, out of noise propagation directing from upstream to downstream in the power transmission path, the noise propagation towards the output shafts 3d, 3d downstream of the countershaft 3c may be effectively reduced.

Comparison of high-frequency noise reducing effect depending on the ground position will now be discussed. When comparing the first embodiment and comparative example, in view of difference in the electrical coupling position CP for grounding, it is necessary to verify the effectiveness of variation in that position. The following describes the comparison of reduction operation of high-frequency noise depending on the ground position in the first embodiment reflecting this.

Figure 14:
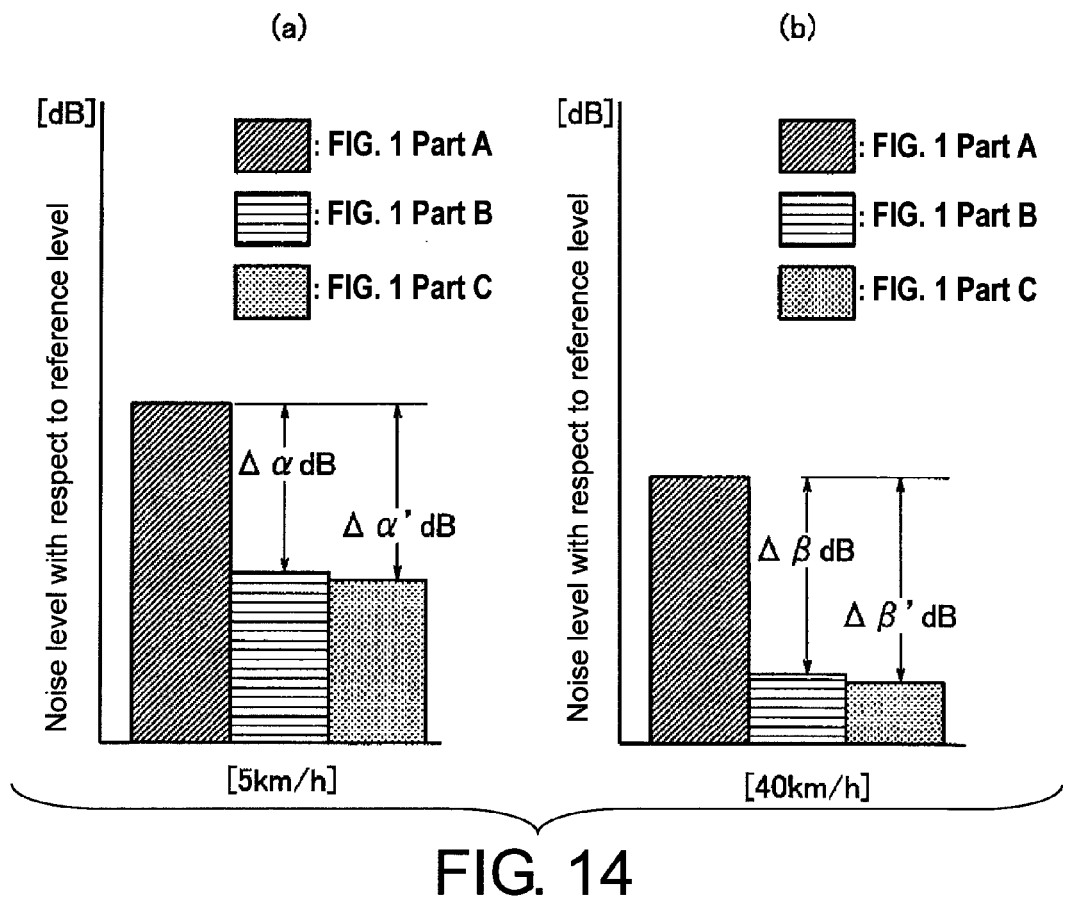
FIG. 14 denote comparative characteristics diagrams showing the comparison of noise level at preset locations of sliding contact brush in a power transmission device for an electric vehicle at the vehicle speed of 5 km/h (a) and at the vehicle speed of 40 km/h (b).

First, in the case of the comparative example of positioning the A portion in FIG. 1 (opposite from the gear reduction mechanism 3) as ground position, as shown in FIG. 14(a), (b), high noise level is noticed at both travel speed of 5 km/h and 40 km/h. In particular, during high speed travel, it is likely that the high-frequency noise poses a problem.

By comparison, in the modification example in the first embodiment that positions the B position in FIG. 1 (shaft end of input shaft) as ground position, as shown in FIG. 14(a), (b), at both vehicle speed of 5 km/h and 40 km/h, noise level is lower as compared to the comparative example (FIG. 1 part A).

In the case the first embodiment in which the position C in FIG. 1 (shaft end of countershaft) is positioned as ground position, as shown in FIG. 14(a), (b), at both travel speeds of 5 km/r and 40 km/h, noise level is lower than the comparative example (FIG. 1 part A).

In other words, when observing the result of the comparison in FIG. 14(a), (b), compared to the noise level in the motor shaft end setup example (FIG. 1 part A), the noise level in the input shaft end setup example (FIG. 1 part B) is lower. Further, the noise level in the countershaft end setup example (FIG. 1 part C) is lower than that in the input shaft end setup example (FIG. 1 part B). Based on the comparison results, by setting the shaft end 3c' of countershaft 3c as ground position, it has been confirmed the reduction in high-frequency noise emitted to the outside.

By looking closer the comparison results, as shown in FIG. 14(d), it has been confirmed that, compared with the noise level in the motor shaft end setup example (FIG. 1 part A), the noise level at 5 km/h travel is reduced by $\Delta\alpha$ dB. The noise level in the countershaft end setup example (FIG. 1 part C) in the first embodiment at 5 km/h travel speed is reduced by $\Delta\alpha'$ dB ($<\Delta\alpha$ dB).

As shown in FIG. 14(b), compared to the noise level in the motor shaft end setup example (FIG. 1 part A), the noise level in the input shaft end setup example (FIG. 1 part B) at 40 km/h travel speed, the noise level is reduced by $\Delta\beta$ dB. The noise level in countershaft end setup example in the first embodiment (FIG. 1 part C) at 40 km/h travel speed is reduced by $\Delta\beta$ dB ($<\Delta\beta'$ dB).

This comparison result confirms that, especially in the first embodiment, during high travel speed, the reduction effect of high-frequency noise emitted to the outside will be effectively reduced.

Effect to prevent forgetting to remove the protective cover will now be discussed. First of all, on the basis of FIG. 15 through FIG. 17, the assembly operation of the sliding contact brush assembly 25 and the brush case cover 16 is described.

Figure 15:
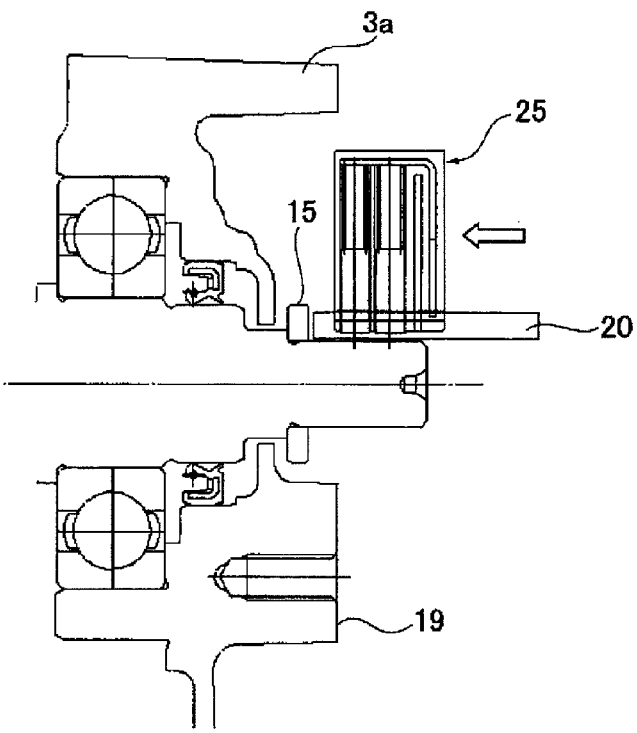
FIG. 15 shows an operative explanation diagram illustrating the assembly operation of the sliding contact brush assembly in a state in which a protective cover is attached in a power transmission device for an electric vehicle.

By inserting the slide pawls 27, 27 provided with the protective cover 20 in sliding relationship with respect to the slide grooves 26, 26 provided with the brush holder 5c, the sliding contact brush assembly 25 is fitted to the protective cover 20. Further, the sliding contact brush assembly 25 fitted with the protective cover 20 is positioned, as shown in FIG. 15, at the position of the shaft end 3c' of the countershaft 3c. By screwing the tighten bolts 22, 22, the sliding contact brush assembly 25 is fastened to the gear case 3a. In addition, by screwing to tighten the ground screw 24, the sliding contact brush assembly 25 is grounded to the gear case 3a.

Figure 16:
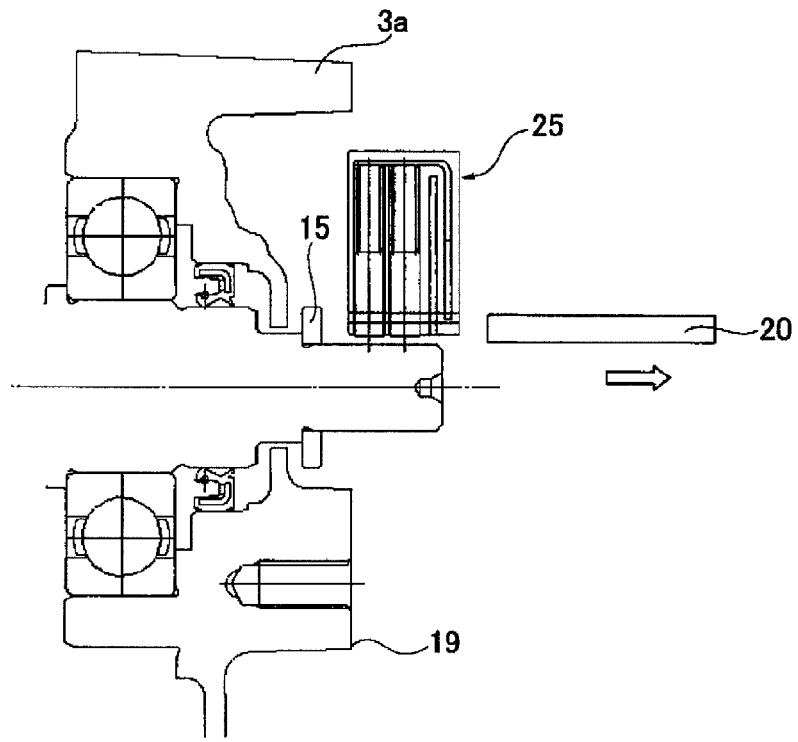
FIG. 16 shows an operative explanation diagram illustrating the removal operation of the protective cover after the sliding contact brush assembly has been assembled in a power transmission device for an electric vehicle.
Figure 17:
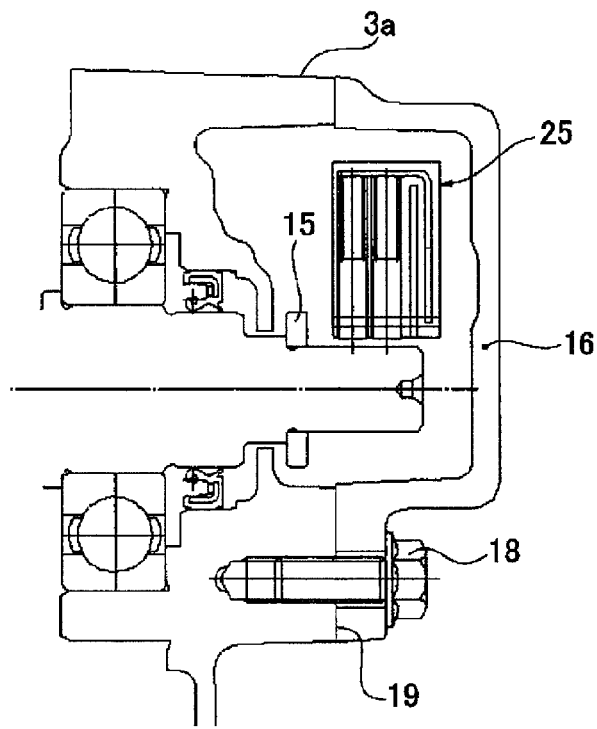
FIG. 17 shows an operative explanation diagram illustrating attaching operation of brush case caver in which the assembled sliding contact brush assembly is covered by the brush case cover in a power transmission device for an electric vehicle.

As described above, after completion of mounting the sliding contact brush assembly 25 to case and grounding of the sliding contact brush assembly 25, the protective cover fitted or attached to the sliding contact brush assembly 25 will be removed by sliding in the direction of the arrow in FIG. 16. Through these operations, installation or assembly of the sliding contact brush assembly 25 will be complete. Further, with respect to the cover mounting portion 19 of the gear case 3a, from which the protective cover 20 has been removed, as shown in FIG. 17, after aligning the mounting position of the brush case cover 16, by screw tightening the bolts 18, the installation or assembly operation of the brush case cover 16 is complete.

Figure 18:
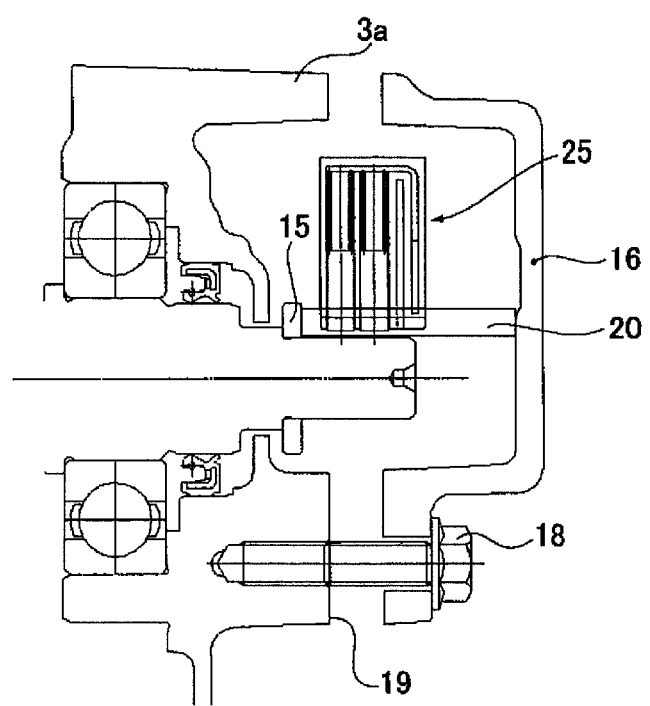
FIG. 18 shows an operative explanation diagram illustrating inability to mount a brush case cover when the brush cover has the protective cover attached.

Thus, when assembling the sliding contact brush assembly 25 to the shaft end 3c' of the countershaft 3c, the protective cover 20 is attached over the brush contacts 5a, 5a of the sliding contact brush assembly 25. Further, when mounting the brush case cover 16 to cover mounting portion 19, if the protective cover 20 remains to be attached, then as shown in FIG. 18, the protective cover 20 interferes with the brush case cover 16. Therefore, unless the protective cover 20 is removed, installation or mounting to the cover mounting portion 19 of the brush case cover 16 is not possible so that the protective cover 20 is prevented from being forgotten to be removed.

Also, the protective cover 20 is configured to have an axial length L by which, when mounting the brush case cover 16 to the cover mounting portion 19, the protective cover would interfere with the brush case cover 16. In other words, the axial length of the protective cover 20 will be longer than the axial length l of the sliding contact brush assembly 25. Therefore, at the fitting operation to brush holder 5c, the protective cover 20 may be easily grasped by hand, which makes the fitting and removal of the protective cover 20 easier with improved workability.

As a result, it is possible to prevent from forgetting the removal of the protection cover 20 during the work of assembling the sliding contact brush assembly 25, while improving workability, the protective cover 20 for protecting the brush contacts 5a, 5a is prevented from being forgotten to be removed with ensuring the reduction performance in radio noise.

In the first embodiment, a configuration was adopted in which the protective cover 20 is not pushed by the brush case cover 18. With this configuration, when an attempt is made to mount the brush case cover 16 with the protection cover 20 remain being attached, by hitting on the stopper 15, protective cover would not be pushed into rearward from the abutment position to the stopper 15, so that brush case cover 16 will be prevented to be mounted. Therefore, when mounting the brush case cover 16, if the protective cover 20 remains attached, the brush case cover 16 is prevented from being pushed in, the removal of the protective cover 20 is prevented from being forgotten.

In the first embodiment, a structure is adopted in which two slide grooves 26, 26 are provided on the brush holder 5c, while two slide pawls 27, 27 are provided in the protective cover 20. With this configuration, since the protective cover 20 is slid in the direction of the grooves, working operation of mounting and removing of the protective cover 20 is facilitated. Also, if an attempt is made to mount brush case cover 16 while the protective cover 20 is being attached, by guiding by slide the protective cover 20, a reliably abutment on the stopper 15 is ensured without the protective cover 20 being placed oblique. Therefore, sliding guide will not only to enhance workability to make removing and mounting operations of the protective cover 20 easier. In addition, removal of protective cover 20 may be reliably prevented from being forgotten.

In the first embodiment, the protective cover 20 is configured of symmetrical structure. This configuration allows, when mounting the protective cover 20 to the brush holder 5c, regardless of the orientation of the protective cover 20, mounting is possible on either orientation. Therefore, when mounting the protective cover 20 to the brush holder 5c, workability is not only improved by the attachment of protective cover 20 without considering the orientation of the protective cover 20, but along with improvement in workability, risk of damage of tip of the protective cover 20 and adhesion of foreign objects and the like will be reduced.

Next, a description of effects will be given. In the power transmission device for an electric vehicle of the first embodiment, the effects listed below are obtained.

(1) Provided are a power transmission mechanism (the gear reduction mechanism 3) interposed between the motor shaft 1b of the motor 1 driven by the inverter 2 and the drive wheels 9, 9 and having the case element (the gear case 3a), axle element (the countershaft 3c and the like) and power transmission element (the first counter gear 3f and the like), a sliding contact brush (the sliding contact brush assembly 25) mounted on the axle end (the shaft end 3c') of the axle element (the countershaft 3c) with one end contacted to the axle end (shaft end 3c') while with the other end electrically grounded to the vehicle body 10, the brush case cover 16 mounted the cover mounting portion 19 that encloses the axle end (the shaft end 3c') of the axle element (the countershaft 3c) in the case element (gear case 3a) and opens, and forming the brush chamber 17 accommodating the sliding contact brush (the sliding contact brush assembly 25), and the brush protective jig (protective cover) fitted or attached on the brush contacts 5a, 5a when mounting the sliding contact brush (the sliding contact brush assembly 25) to the axle end (the shaft end 3c') and is configured to have an axial length L by which to contact the brush case cover 16 when mounting the brush case cover 16 to the cover mounting portion 19 in the attached state of the protective jig (FIG. 3). For this reason, when assembling the sliding contact brush (sliding contact brush assembly 25), while workability is improved, the brush protective jig (protective cover 20) protecting the brush contacts 5a, 5a is prevented from being forgotten to be removed and reduction performance of radio noise may be ensured.

(2) The axle end (the shaft end 3c') of the axle element (the countershaft 3c) is provided with the stopper 15 at the rearward position from the abutment position of the brush contacts 5a, 5a, which prevents the brush protective jig (protective cover 20) from being pushed in an attached state when mounting the brush case cover 16 to the cover mounting portion 19 (FIG. 3). Thus, in addition to the effect (1) described above, at mounting of the brush case cover 16, by preventing the brush case cover 16 from being pushed in a state in which the brush protective jig (protective cover 20) remains in the attached state so that the removal of the protective cover 20 may securely be prevented from being forgotten.

(3) The brush contacts 5a, 5a is provided in the brush holder 5c that is disposed, when fixed to the case element (gear case 3a), with maintaining contact to the axle end (the shaft end 3') of the shaft element (the countershaft 3c), and the brush holder 5c is provided with the pair of parallel slide grooves 26, 26 extending axially from both side surfaces sandwiching the end face from which the brush contacts 5a, 5a projects. The brush protective jig (protective cover 20) is provided with the pair of parallel slide pawls 27, 27 to be engaged with a parallel slide grooves 26, 26 provided with the brush holder 5c, when mounted to the brush holder 5c (FIG. 6). Thus, in addition to the effects (1) or (2), mounting and removal operation of the brush protective jig (protective cover 20) will be easy by the slidably guide to achieve the improvement in workability. In addition, the removal of brush protective jig (protective cover 20) will be prevented from being forgotten reliably.

(4) The brush protective jig is configured to be the protective cover 20 provided with the main cover portion 28 to cover the brush contacts 5a, 5a, the pair of sub-cover portions 29,29 extending from both sides of the main cover portion 28, and the pair of parallel slide pawls 27, 27 formed in the end portion of the pair of sub-cover portions 29, 29, wherein the protective cover 20 is configured to have a left-right symmetrical structure having an axial symmetry axis L1 and a lateral symmetry axis L2 perpendicular to the axis (FIG. 8). Thus, in addition to the effect (3) described above, when mounting the protective cover 20 to brush holder 5c, mounting operation without care about the orientation of the protective cover 20 allows not only improvement in workability, but also reduce the risk of the tip or distal end of the protective cover being damaged or adhesion of foreign matters or the like along with the improvement in workability.

Although the power transmission device for an electric vehicle according to the present invention above has been described with reference to the first embodiment, the concrete structure is not limited to this first embodiment, but unless the essence or sprit of the present invention related to each claim is not departed, design change and addition are allowed.

In the first embodiment, as a power transmission mechanism, an example of the gear reduction mechanism 3 by two-step-reduction is shown. However, for example, such as one step reduction, three-step-reduction and the like, a gear reduction mechanism of other than the two-step-reduction may be employed. Alternatively, a gear change mechanism using a planetary gear may be also employed. In addition, a belt type continuous transmission or toroidal type continuous transmission may be examples. In short, as long as the power transmission device includes a case element, axle element and power transmission element, such power transmission mechanism is to be included in the present invention.

In the first embodiment, the brush protective jig is configured as the protective cover 20 provided with the main cover portion 28, the sub-cover portion 29, 29, and the slide pawls 27, 27, for example. However, as brush protective jig, as long as the jig includes a function to cover brush contact, the specific configuration is not limited to the structure in the first embodiment, but various design changes may be available. Note that the protective cover 20 as brush protective jig may be mounted or attached when assembling the sliding contact brush assembly 25 to the shaft end 3c', or may be intended to be attached to the sliding contact brush assembly 25 in advance.

In the first embodiment, an example is shown as applied to an electric vehicle, application to a hybrid vehicle, fuel cell vehicle and the like is possible. In short, the invention may be applicable to an electrically driven vehicle with an inverter and motor as source of noise generation.

The invention claimed is:

1. A power transmission device for an electrically driven vehicle, comprising:
   a power transmission mechanism interposed between a motor shaft of a motor driven by an inverter and a drive wheel, the power transmission mechanism including a case element, an axle element and a power transmission element;
   a sliding contact brush mounted on the axle end of the axle element with one end of a brush contact being configured to be in contact with the axle end and the other end of the brush contact being configured to be electrically grounded to a vehicle body;
   a brush case cover selectively mounted to the case element to enclose the axle end of the axle element in the case element, and to form a brush chamber accommodating the sliding contact brush; and
   a brush protective jig mounted to cover the brush contact when mounting the sliding contact brush to the axle end, the brush protective jig being dimensioned to contact the brush case cover and to prevent the brush case cover from being mounted to the case element while the brush protective jig is in an attached state that covers the brush contact.

2. The power transmission device as claimed in claim 1, wherein
   the axle end of the axle element is provided with a stopper at a rearward position from an abutment position of the brush contact where the one end of the brush contact contacts the axle end, the stopper preventing the brush protective jig from being pushed in an axial direction of the axle element while the brush protective jig is in the attached state when mounting the brush case cover to the case element.

3. The power transmission device as claimed in claim 1, wherein
   the sliding contact brush includes a brush holder that supports the brush contact within the case element, the brush holder including a pair of oppositely facing side surfaces and an end face disposed between the side surfaces, the brush contact projects from the end face of the brush holder, the brush holder further including a pair of parallel slide grooves extending axially along the side surfaces of the brush holder, and
   the brush protective jig includes a pair of parallel slide pawls engaged with the parallel slide grooves of the brush holder while the brush protective jig is in the attached state such that the brush protective jig is mounted to the brush holder.

4. The power transmission device as claimed in claim 3, wherein
   the brush protective jig is configured as a protective cover that includes a main cover portion covering the brush contact and a pair of sub-cover portions extending from both sides of the main cover portion, the slide pawls being formed in the sub-cover portions, the protective cover being a left-right symmetrical structure having an axial symmetry axis and a lateral symmetry axis, which is perpendicular to an axial direction of the axle element while the brush protective jig is in the attached state.

5. A manufacturing method of a power transmission device for an electrically driven vehicle having a power transmission mechanism interposed between a motor shaft of a motor driven by an inverter and a drive wheel, and the power transmission mechanism including a case element, an axle element and a power transmission element, the manufacturing method comprising:
   mounting a sliding contact brush on an axle end of the axle element with a brush protective jig covering a brush contact of the sliding contact brush, the brush protective jig being dimensioned to interfere with a brush case cover from being mounted to the case element while the brush protective jig is in an attached state that covers the brush contact;
   removing the brush protective jig covering the brush contact after placing the sliding contact brush on the axle end such that one end of the sliding contact brush contacts the axle end and the other end is configured to be electrically grounded to a vehicle body; and
   mounting the brush case cover to the case element that encloses the axle end of the axle element in the case element, and to form a brush chamber accommodating the sliding contact brush.

6. The power transmission device as claimed in claim 2, wherein
   the sliding contact brush includes a brush holder that supports the brush contact within the case element, the brush holder including a pair of oppositely facing side surfaces and an end face disposed between the side surfaces, the brush contact projects from the end face of the brush holder, the brush holder further including a pair of parallel slide grooves extending axially along the side surfaces of the brush holder, and
   the brush protective jig includes a pair of parallel slide pawls engaged with the parallel slide grooves of the brush holder while the brush protective jig is in the attached state such that the brush protective jig is mounted to the brush holder.

7. The power transmission device as claimed in claim 6, wherein
   the brush protective jig is configured as a protective cover that includes a main cover portion covering the brush contact and a pair of sub-cover portions extending from both sides of the main cover portion, the slide pawls being formed in the sub-cover portions, the protective cover being a left-right symmetrical structure having an axial symmetry axis and a lateral symmetry axis, which is perpendicular to an axial direction of the axle element while the brush protective jig is in the attached state.

* * * * *